(12) United States Patent
Shepherd et al.

(10) Patent No.: US 11,318,677 B2
(45) Date of Patent: May 3, 2022

(54) FEATURE PROTECTION FOR THREE-DIMENSIONAL PRINTING

(71) Applicant: HEWLETT-PACKARD DEVELOPMENT COMPANY, L.P., Spring, TX (US)

(72) Inventors: Joshua Shepherd, Vancouver, WA (US); Brent Ewald, Vancouver, WA (US); Matthew A. Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,365

(22) PCT Filed: Dec. 20, 2017

(86) PCT No.: PCT/US2017/067740
§ 371 (c)(1),
(2) Date: Oct. 15, 2019

(87) PCT Pub. No.: WO2019/125450
PCT Pub. Date: Jun. 27, 2019

(65) Prior Publication Data
US 2020/0316867 A1 Oct. 8, 2020

(51) Int. Cl.
 B29C 64/386 (2017.01)
 B33Y 50/00 (2015.01)
 G05B 19/4099 (2006.01)

(52) U.S. Cl.
 CPC ............ B29C 64/386 (2017.08); B33Y 50/00 (2014.12); G05B 19/4099 (2013.01); *G05B 2219/35134* (2013.01); *G05B 2219/49023* (2013.01)

(58) Field of Classification Search
 CPC ... B29C 64/386; B33Y 50/00; G05B 19/4099; G05B 2219/35134; G05B 2219/49023;
 (Continued)

(56) References Cited

U.S. PATENT DOCUMENTS 6,317,509 B1 * 11/2001 Simanovsky .......... G01V 5/005
                                                    250/363.04
6,636,211 B2    10/2003  Chartier et al.
(Continued)

FOREIGN PATENT DOCUMENTS

EP      2763058 A1      8/2014
WO   WO 2013/013146 A1  1/2013

OTHER PUBLICATIONS

Aremu,A.O. et al., a Voxel-based Method of Constructing and Skinning Conformal and Functionally Graded Lattice Structures Suitable for Additive Manufacturing, Additive Manufacturing, vol. 13, Jan. 2017, pp. 1-13.

*Primary Examiner* — Thomas C Lee
*Assistant Examiner* — Michael Tang
(74) *Attorney, Agent, or Firm* — Mannava & Kang

(57) ABSTRACT

In some examples, with respect to feature protection for three-dimensional printing, a three-dimensional model of a three-dimensional object to be printed may be ascertained. A determination may be made as to whether a configuration of a three-dimensional model feature of the three-dimensional model matches a removable feature configuration from a set of removable feature configurations. Based on a determination that the configuration of the three-dimensional model feature of the three-dimensional model matches the removable feature configuration from the set of removable feature configurations, the three-dimensional model feature may be removed from the three-dimensional model to generate a modified three-dimensional model.

13 Claims, 6 Drawing Sheets

(58) Field of Classification Search
CPC ...... Y02P 10/25; G06F 30/10; G06F 2113/10;
G06F 2119/18; B22F 10/10; G06T 19/20;
G06T 2219/2021
See application file for complete search history.

(56) References Cited

U.S. PATENT DOCUMENTS

| | | |
|---|---|---|
| 6,792,398 B1 | 9/2004 | Handley et al. |
| 7,077,638 B2 | 7/2006 | Leyden et al. |
| 8,175,734 B2 | 5/2012 | Fogel et al. |
| 9,744,725 B2 * | 8/2017 | Stava .................... B29C 64/386 |
| 2007/0057945 A1 * | 3/2007 | Olson ..................... G06T 17/10 345/424 |
| 2010/0284618 A1 * | 11/2010 | Ioannou ............. G06K 9/00201 382/190 |
| 2011/0081071 A1 * | 4/2011 | Benson ................ G06T 11/005 382/154 |
| 2011/0087350 A1 * | 4/2011 | Fogel ...................... G06T 19/00 700/98 |
| 2011/0222750 A1 * | 9/2011 | Liao ....................... A61B 6/503 382/131 |
| 2013/0176312 A1 | 7/2013 | Schouwenburg et al. |
| 2013/0297059 A1 | 11/2013 | Grifith et al. |
| 2017/0001375 A1 * | 1/2017 | Melly ................ B29C 67/0088 |
| 2017/0028650 A1 * | 2/2017 | Utsunomiya ......... B29C 64/165 |
| 2017/0345135 A1 * | 11/2017 | Xu ........................ G06T 11/003 |
| 2018/0144539 A1 * | 5/2018 | Kredi ...................... G06T 15/08 |
| 2019/0152152 A1 * | 5/2019 | O'Leary ................ B33Y 50/00 |
| 2020/0372658 A1 * | 11/2020 | De Winde ............... G06T 7/155 |

\* cited by examiner

600

```
ASCERTAIN A THREE-DIMENSIONAL MODEL OF A THREE-
DIMENSIONAL OBJECT TO BE PRINTED
602
```

```
DETERMINE A SHELL THAT REPRESENTS OUTER THREE-
DIMENSIONAL MODEL FEATURES OF THE THREE-DIMENSIONAL
MODEL
604
```

```
DETERMINE, FOR THE SHELL, WHETHER A CONFIGURATION OF A
THREE-DIMENSIONAL MODEL FEATURE OF THE THREE-DIMENSIONAL
MODEL MATCHES A REMOVABLE FEATURE CONFIGURATION FROM A
SET OF REMOVABLE FEATURE CONFIGURATIONS
606
```

```
BASED ON A DETERMINATION THAT THE CONFIGURATION OF THE
THREE-DIMENSIONAL MODEL FEATURE OF THE THREE-DIMENSIONAL
MODEL MATCHES THE REMOVABLE FEATURE CONFIGURATION FROM
THE SET OF REMOVABLE FEATURE CONFIGURATIONS, REMOVE THE
THREE-DIMENSIONAL MODEL FEATURE FROM THE THREE-
DIMENSIONAL MODEL TO GENERATE A MODIFIED THREE-
DIMENSIONAL MODEL
608
```

*FIG. 6*

FEATURE PROTECTION FOR THREE-DIMENSIONAL PRINTING

BACKGROUND

In three-dimensional printing, a three-dimensional object may be formed, for example, by successively adding layers of material under computer control. The three-dimensional object may be based on a three-dimensional model that is utilized by a three-dimensional printer. Various techniques may be implemented to ensure quality of features of the three-dimensional object.

BRIEF DESCRIPTION OF DRAWINGS

Features of the present disclosure are illustrated by way of example and not limited in the following figure(s), in which like numerals indicate like elements, in which:

FIG. 6 illustrates an example flowchart of a method for feature protection for three-dimensional printing.

DETAILED DESCRIPTION

Figure 1:
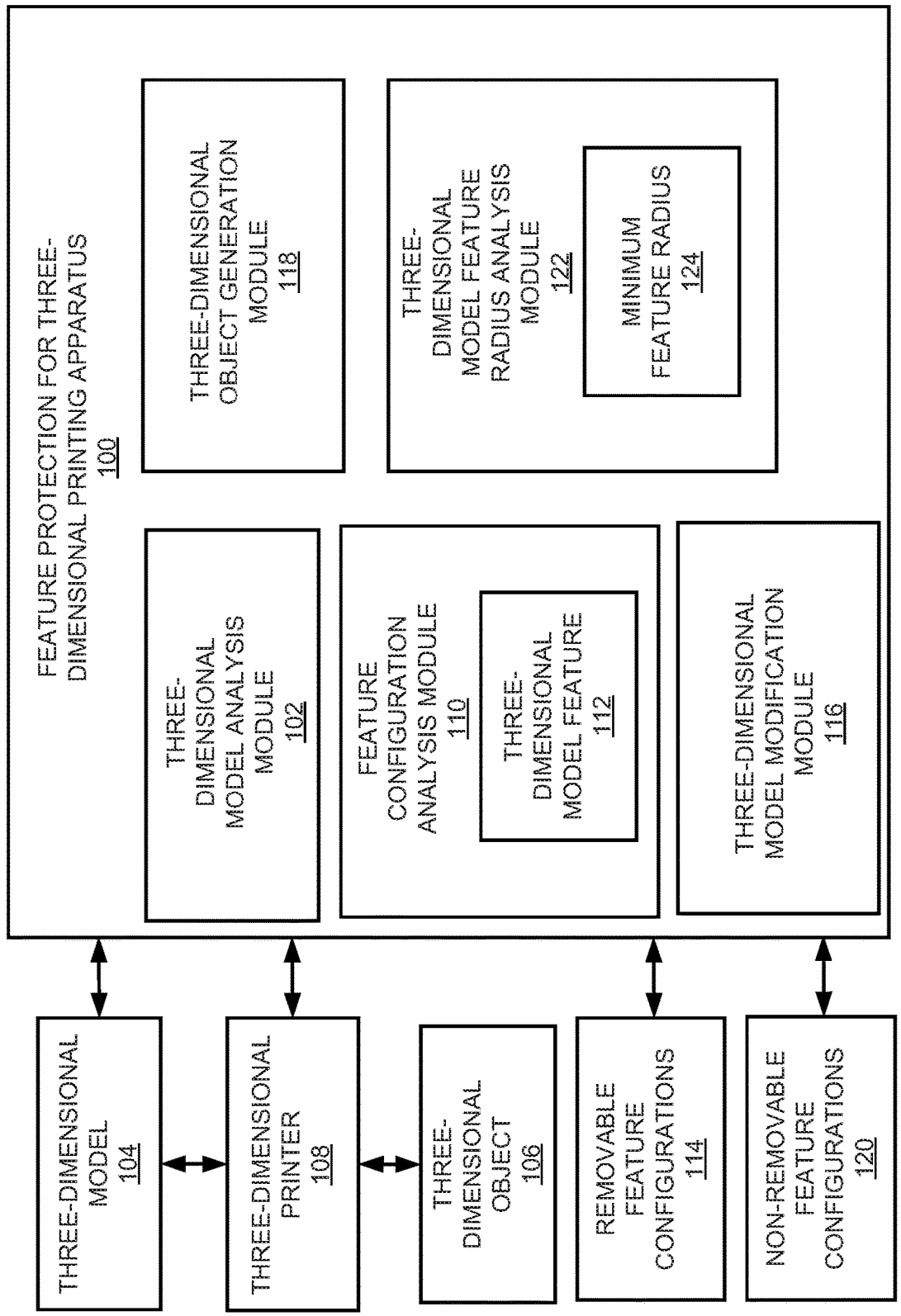
FIG. 1 illustrates an example layout of a feature protection for three-dimensional printing apparatus, and associated components.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Feature protection for three-dimensional printing apparatuses, methods for feature protection for three-dimensional printing, and non-transitory computer readable media having stored thereon machine readable instructions to provide feature protection for three-dimensional printing are disclosed herein. The apparatuses, methods, and non-transitory computer readable media disclosed herein provide for selective saving of particular features (e.g., relatively thin features such as hair, fins, etc.) of a three-dimensional object (e.g., a head of a person, a beam including fins, etc.) that may not be present in a final build result of the three-dimensional object. For example, particular features of a three-dimensional object may be saved by either growing the features (e.g., increasing a thickness of hairs, etc.) or keeping the features the same size, while shrinking (e.g., eroding) other features of the three-dimensional object. In this regard, relatively large features may be shrunk by eroding, smaller features may be grown by dilation, or a combination of both eroding and dilation may be applied to the three-dimensional object.

As disclosed herein, a three-dimensional object may be based on a three-dimensional model that is utilized by a three-dimensional printer to generate the three-dimensional object. In certain cases, the three-dimensional model may include features that may be too thin to be printed consistently without breaking apart. For example, the three-dimensional model may represent a head of a person and include hairs that may be relatively thin (e.g., one voxel thin). In this regard, it may be technically challenging to generate the three-dimensional object to accurately retain the relatively thin features of the three-dimensional model, without the relatively thin features breaking apart or being poorly reproduced. According to another example, a three-dimensional object formed by the three-dimensional printing may be subject to thermal expansion. In this regard, erosion may be applied to outer layers of voxels of the three-dimensional object to shrink the three-dimensional object to counteract dimensional variation due to size dependent temperature effects. In this regard, it may be technically challenging to prevent undesirable shrinkage and/or elimination of relatively thin features of the three-dimensional object due to the applied erosion. In a similar manner, with respect to a 'chemical binder' system where a binder fluid may 'bleed' into powder areas beyond where it was printed, it may be technically challenging prevent undesirable 'bleed' of the binder fluid. Yet further, with respect to the metal three-dimensional printing systems where a binder agent is applied in a printer to a bed of powder to generate a 'green part', and where the 'green part' is subsequently fused/sintered in a separate oven/furnace, it may be technically challenging to accurately form the 'green part'.

The apparatuses, methods, and non-transitory computer readable media disclosed herein address at least the aforementioned technical challenges by selectively saving, as disclosed herein, particular features (e.g., relatively thin features) of a three-dimensional object that may not otherwise be present in a final build result of the three-dimensional object. For example, particular features of a three-dimensional object may be saved, or preserved, by either growing the features or keeping the features the same size. In this regard, other features of the three-dimensional object may be shrunk (e.g., by eroding). For example, after a three-dimensional model of a three-dimensional object is divided (e.g., by slicing) into layers of voxels (e.g., three-dimensional pixels), the apparatuses, methods, and non-transitory computer readable media disclosed herein may be implemented to retain or grow relatively small features that may be too thin or fragile to be present after the three-dimensional object has been printed. In this regard, the relatively small features may also be retained or grown depending on the accuracy of the three-dimensional printer (e.g., the erosion and dilation techniques as disclosed herein may be applied to features which are below a comparative dimensional threshold). The apparatuses, methods, and non-transitory computer readable media disclosed herein may identify a skeleton (e.g., a backbone) of a three-dimensional model, and then selectively dilate (e.g., opposite of erosion) the skeleton to add it back into the original three-dimensional model.

The apparatuses, methods, and non-transitory computer readable media disclosed herein may provide for implementation of relatively small feature protection to a three-dimensional model of a three-dimensional object. In this regard, small features may be grown arbitrarily large in order to ensure that they are ultimately present in the printed three-dimensional object.

The apparatuses, methods, and non-transitory computer readable media disclosed herein may provide for the selectively saving of particular features of a three-dimensional object by utilizing, as disclosed herein, a cut vertex lookup table that provides for connectedness when eroding voxels.

The apparatuses, methods, and non-transitory computer readable media disclosed herein may provide for the selectively saving of particular features of a three-dimensional object by setting of a minimum feature size to a specified radius.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of a feature protection for three-dimensional printing apparatus (hereinafter also referred to as "apparatus 100").

Referring to FIG. 1, the apparatus 100 may include a three-dimensional model analysis module 102 to ascertain a three-dimensional model 104 of a three-dimensional object 106 to be printed. For example, the three-dimensional object 106 may be printed by a three-dimensional printer 108.

A feature configuration analysis module 110 may determine whether a configuration of a three-dimensional model feature 112 of the three-dimensional model 104 matches a removable feature configuration from a set of removable feature configurations 114.

Based on a determination that the configuration of the three-dimensional model feature 112 of the three-dimensional model 104 matches the removable feature configuration from the set of removable feature configurations 114, a three-dimensional model modification module 116 may remove the three-dimensional model feature 112 from the three-dimensional model 104 to generate a modified three-dimensional model. In this regard, a three-dimensional object generation module 118 may cause the three-dimensional object 106 to be printed based on the modified three-dimensional model without a voxel of the three-dimensional model feature 112 that has been removed.

The feature configuration analysis module 110 may further determine whether the configuration of the three-dimensional model feature 112 of the three-dimensional model 104 matches a non-removable feature configuration from a set of non-removable feature configurations 120.

Based on a determination that the configuration of the three-dimensional model feature 112 of the three-dimensional model 104 matches the non-removable feature configuration from the set of non-removable feature configurations 114, the three-dimensional model modification module 116 may retain the three-dimensional model feature 112 in the three-dimensional model 104. In this regard, the three-dimensional object generation module 118 may cause the three-dimensional object 106 to be printed based on the three-dimensional model 104 that includes a voxel of the three-dimensional model feature 112 that has been retained.

A three-dimensional model feature radius analysis module 122 may identify a three-dimensional model feature of the modified three-dimensional model 104 that does not include a minimum feature radius 124. In this regard, the three-dimensional model feature radius analysis module 122 may increase a radius of the identified three-dimensional model feature to the minimum feature radius 124.

According to examples, the non-removable feature configuration may include a centrally disposed voxel of the three-dimensional model 104, and the centrally disposed voxel of the three-dimensional model 104 may be disposed between two further voxels of the three-dimensional model 104.

According to examples, the removable feature configuration may include a centrally disposed voxel of the three-dimensional model 104, and the centrally disposed voxel of the three-dimensional model 104 may be disposed centrally and adjacent to three further voxels of the three-dimensional model 104.

According to examples, the removable feature configuration may include a voxel of a set of four voxels of the three-dimensional model 104 the set of four voxels may form a square shape (or another type of shape) with respect to the three-dimensional model 104.

Figure 2:
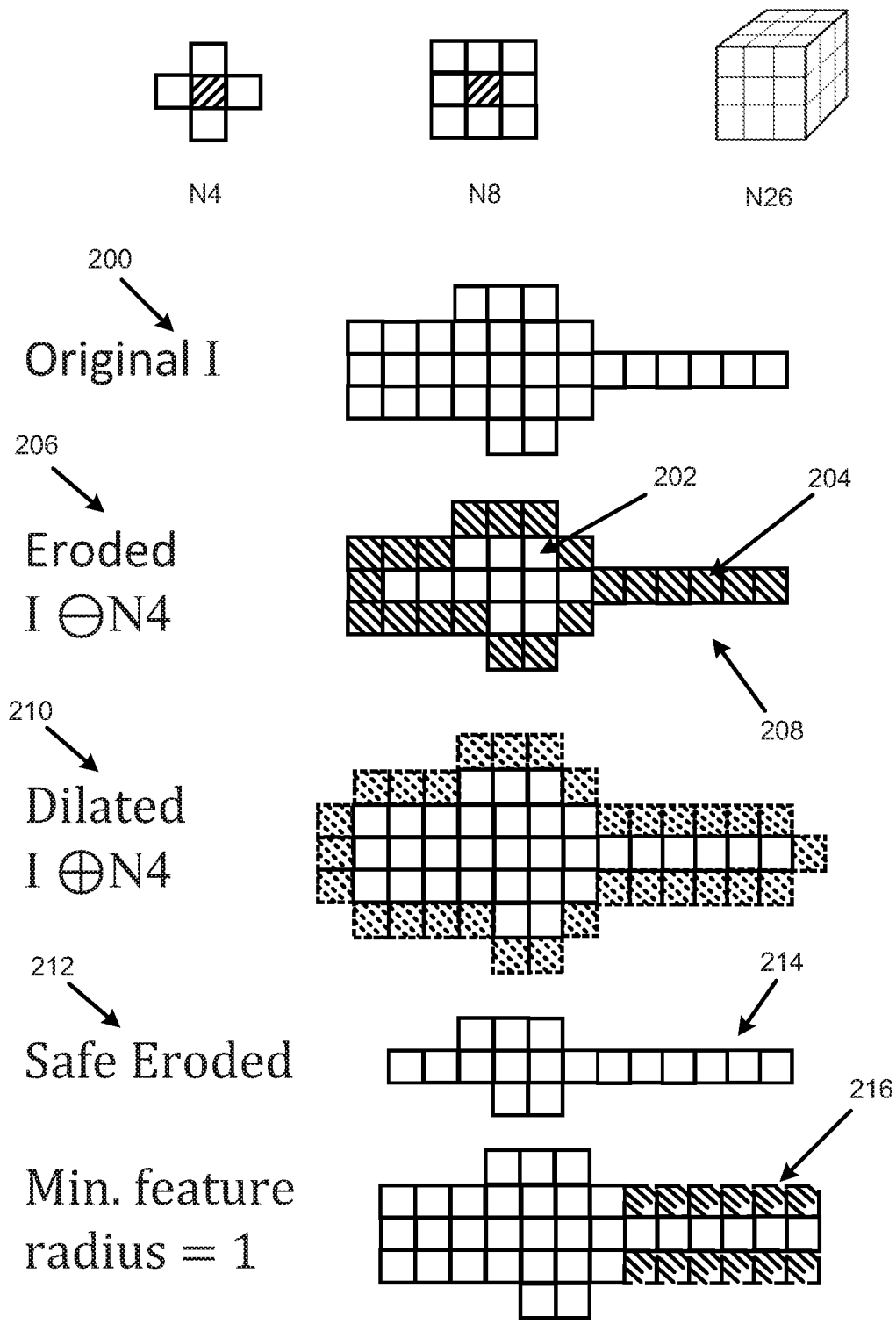
FIG. 2 illustrates example stages of operation of the feature protection for three-dimensional printing apparatus of FIG. 1.
Figure 3:
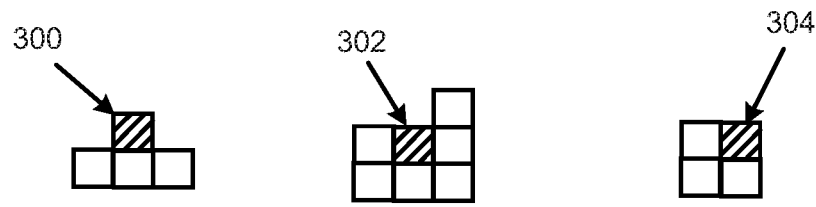
FIG. 3 illustrates examples of removable feature configurations to illustrate operation of the feature protection for three-dimensional printing apparatus of FIG. 1.

Operation of the apparatus 100 is described in further detail with reference to FIGS. 1-3. In this regard, FIG. 2 illustrates example stages of operation of the apparatus 100. Further, FIG. 3 illustrates examples of removable feature configurations to illustrate operation of apparatus 100.

Referring to FIG. 1, as disclosed herein, particular features of a three-dimensional object may be saved by either growing the features (e.g., increasing a thickness of hairs, etc.) or keeping the features the same size, while shrinking (e.g., eroding) other features of the three-dimensional object. In this regard, referring to FIG. 2, a three-dimensional model 104 of a three-dimensional object 106 to be printed may be denoted I as shown at 200. The three-dimensional model 104 may be formed, for example, of two-dimensional structuring elements N4, N8, etc., three-dimensional structuring element N26, or other types of two-dimensional and/or three-dimensional structuring elements as also shown in FIG. 2.

A skeleton of the three-dimensional model 104 may be determined. For example, as shown in FIG. 2, the skeleton of the three-dimensional model 104 may be represented by inner voxels 214, whereas a shell of the three-dimensional model 104 may be represented by outer voxels 204. The voxels 202 may represent a result of an erosion on the three-dimensional model at 200.

The eroded three-dimensional model 104 at 206 may include erosion of all of the outer voxels. In this regard, erosion of all of the outer voxels may result in elimination of the six voxels at 208.

Alternatively, the dilated three-dimensional model 104 at 210 may include dilation of each of the outer voxels from the original three-dimensional model 104 at 200.

For the apparatus 100, instead of eroding as shown at 206 or dilating as shown at 210, a "safe erosion" may be performed as shown at 212. For the "safe erosion" at 212, as disclosed herein, the three-dimensional model analysis module 102 may identify features of the three-dimensional model 104 that are not in an "opening". The opening operation may be described as a sequential operation of eroding an object, and then dilating the result of the erosion. The "opening" may be represented by the following operation for an N4 two-dimensional structuring element, where ⊖ represents erosion, and ⊕ represents dilation:

$$I \bullet N4 = (I \ominus N4) \oplus N4$$

Further, the three-dimensional model analysis module 102 may determine the shell (e.g., at 204) of the three-dimensional model 104, where certain features may be removed.

As disclosed herein, the feature configuration analysis module 110 may determine whether a configuration of a three-dimensional model feature 112 of the three-dimensional model 104 matches a removable feature configuration from the set of removable feature configurations 114. Based on a determination that the configuration of the three-dimensional model feature 112 of the three-dimensional model 104 matches the removable feature configuration from the set of removable feature configurations 114, the three-dimensional model modification module 116 may remove the three-dimensional model feature 112 from the three-dimensional model 104 to generate a modified three-dimensional model. In this regard, the three-dimensional model modification module 116 may remove voxels from the three-dimensional model 104 that are in the shell and that are not cut vertices (e.g., voxels that connect other voxels). That is, the three-dimensional model modification module 116 may remove the external corners of the shell that are not cut vertices. Further, once the external corners of the shell that are not cut vertices are removed, the three-dimensional model modification module 116 may remove the remaining voxels in the shell that are not cut vertices. Referring to FIG. 3, examples of features that may be removed are shown at 300, 302, and 304. The removal operation may be represented by the following operation:

$$I \Delta B = I \& (\sim B)$$

This removal operation finds the intersection of voxels that are a part of I and not a part of B.

Figure 4:
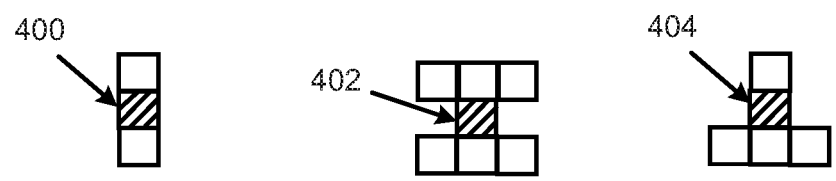
FIG. 4 illustrates examples of non-removable feature configurations to illustrate operation of the feature protection for three-dimensional printing apparatus of FIG. 1.

As disclosed herein, the feature configuration analysis module 110 may further determine whether the configuration of the three-dimensional model feature 112 of the three-dimensional model 104 matches a non-removable feature configuration from the set of non-removable feature configurations 120. Based on a determination that the configuration of the three-dimensional model feature 112 of the three-dimensional model 104 matches the non-removable feature configuration from the set of non-removable feature configurations 114, the three-dimensional model modification module 116 may retain the three-dimensional model feature 112 in the three-dimensional model 104. In this regard, examples of non-removable features are shown in FIG. 4, where the features at 400, 402, and 404 may not be removed.

The feature identification of features that are not in the "opening" (hereinafter also designated "non-opening feature identification") may be performed recursively for a specified number of times (e.g., 2 times, 3 times, etc.). In this regard, the number of times a recursive identification and subsequent removal are performed may depend on factors such as a type of the three-dimensional model 104, a type of the three-dimensional object 106, etc. Further, the number of times a recursive identification and subsequent removal are performed may also depend on factors such as a specified number of depletions of the original three-dimensional model 104.

As disclosed herein, the three-dimensional model feature radius analysis module 122 may identify a three-dimensional model feature of the modified three-dimensional model 104 that does not include a minimum feature radius 124. In this regard, the three-dimensional model feature radius analysis module 122 may increase a radius of the identified three-dimensional model feature to the minimum feature radius 124. Thus, the three-dimensional model feature radius analysis module 122 may implement dilation of the resulting three-dimensional model (hereinafter also designated "resulting three-dimensional model dilation") from the "non-opening feature identification", and add the resulting dilated three-dimensional model from the "non-opening feature identification" into the original (or eroded) three-dimensional model. This dilation with respect to the "resulting three-dimensional model dilation" may set the minimum feature radius 124 to a value of n, which represents the radius to which all small features are to be dilated. For example, the dilation with respect to the "resulting three-dimensional model dilation" may set the minimum feature radius 124 of the single voxels at 214 to an increased value of "1" as shown at 216.

Figure 5:
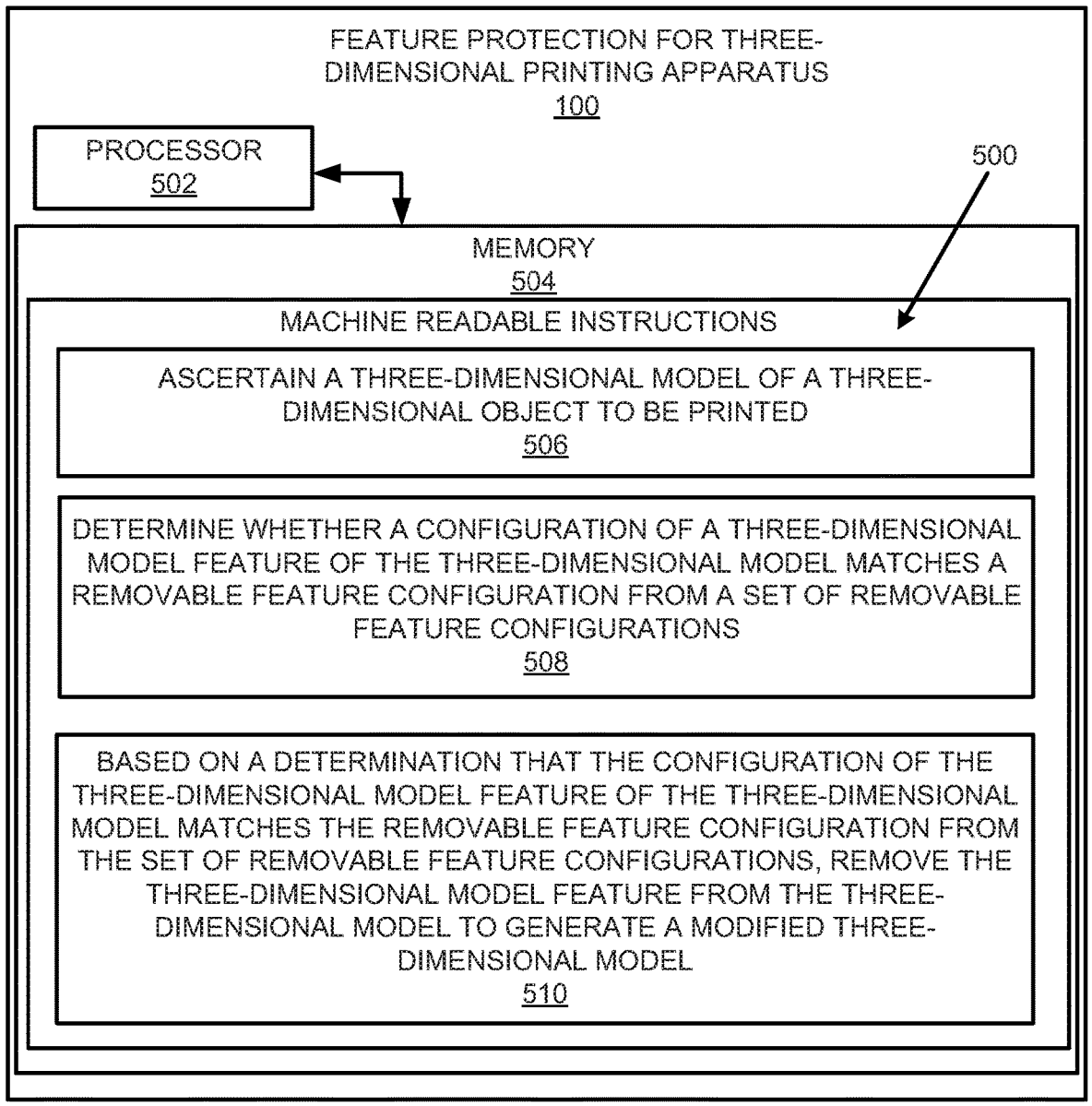
FIG. 5 illustrates an example block diagram for feature protection for three-dimensional printing.
Figure 7:
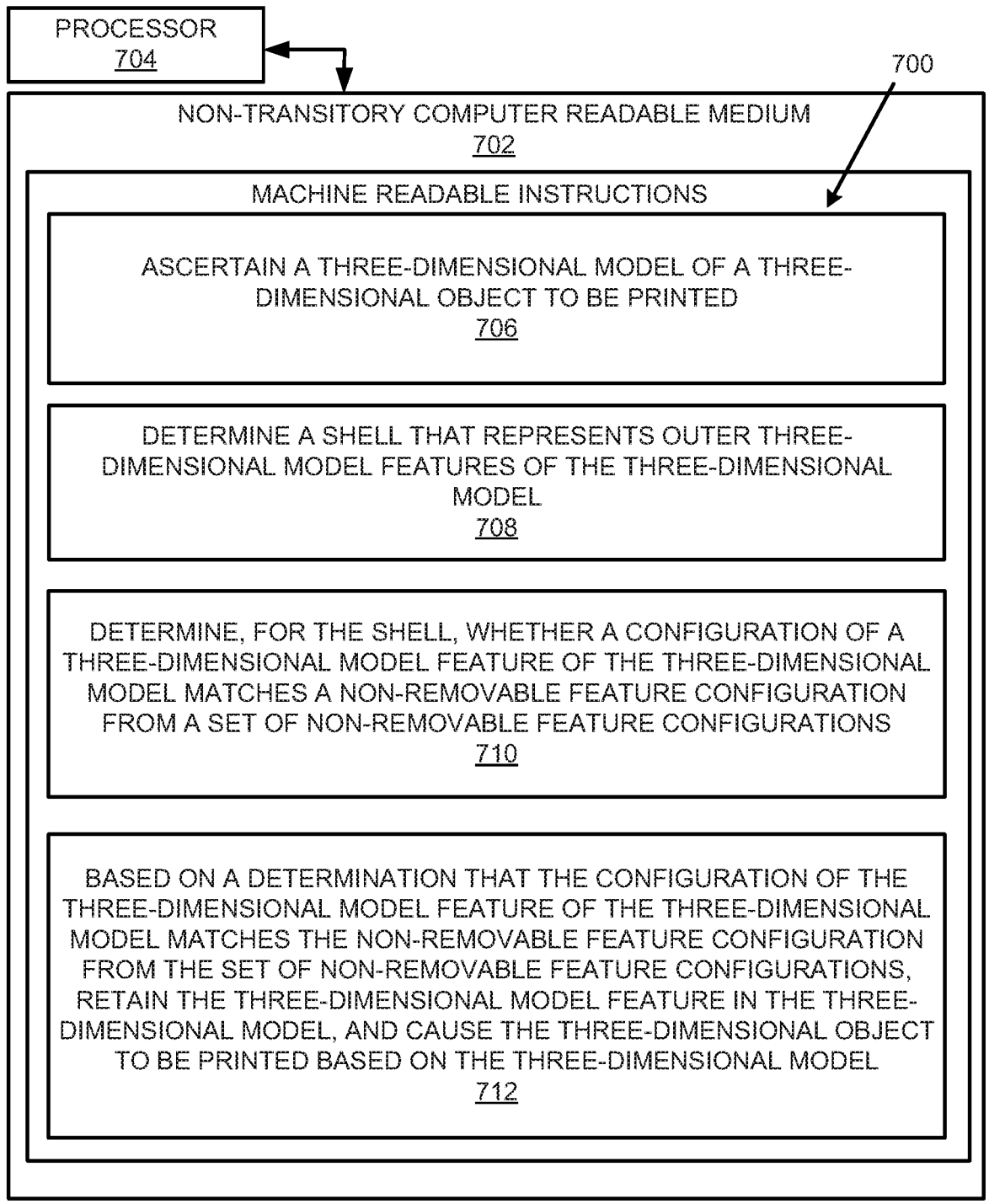
FIG. 7 illustrates a further example block diagram for feature protection for three-dimensional printing.

FIGS. 5-7 respectively illustrate an example block diagram 500, an example flowchart of a method 600, and a further example block diagram 700 for feature protection for three-dimensional printing. The block diagram 500, the method 600, and the block diagram 700 may be implemented on the apparatus 100 described above with reference to FIG. 1 by way of example and not limitation. The block diagram 500, the method 600, and the block diagram 700 may be practiced in other apparatus. In addition to showing the block diagram 500, FIG. 5 shows hardware of the apparatus 100 that may execute the instructions of the block diagram 500. The hardware may include a processor 502, and a memory 504 (i.e., a non-transitory computer readable medium) storing machine readable instructions that when executed by the processor 502 cause the processor to perform the instructions of the block diagram 500. The memory 504 may represent a non-transitory computer readable medium. FIG. 6 may represent a method for feature protection for three-dimensional printing. FIG. 7 may represent a non-transitory computer readable medium 702 having stored thereon machine readable instructions to provide feature protection for three-dimensional printing. The machine readable instructions, when executed, cause a processor 704 to perform the instructions of the block diagram 700 also shown in FIG. 7.

The processor 502 of FIG. 5 and/or the processor 704 of FIG. 7 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 702 of FIG. 7), such as hardware storage devices (e.g., RAM (random access memory), ROM (read only memory), EPROM (erasable, programmable ROM), EEPROM (electrically erasable, programmable ROM), hard drives, and flash memory). The memory 504 may include a RAM, where the machine readable instructions and data for a processor may reside during runtime.

Referring to FIGS. 1-5, and particularly to the block diagram 500 shown in FIG. 5, the memory 504 may include instructions 506 to ascertain a three-dimensional model 104 of a three-dimensional object 106 to be printed.

The processor 502 may fetch, decode, and execute the instructions 508 to determine whether a configuration of a three-dimensional model feature 112 of the three-dimensional model 104 matches a removable feature configuration from a set of removable feature configurations 114.

Based on a determination that the configuration of the three-dimensional model feature 112 of the three-dimensional model 104 matches the removable feature configuration from the set of removable feature configurations 114, the processor 502 may fetch, decode, and execute the instructions 510 to remove the three-dimensional model feature 112 from the three-dimensional model 104 to generate a modified three-dimensional model.

Referring to FIGS. 1-4 and 6, and particularly FIG. 6, for the method 600, at block 602, the method may include ascertaining a three-dimensional model 104 of a three-dimensional object 106 to be printed.

At block 604 the method may include determining a shell (e.g., see FIG. 2) that represents outer three-dimensional model features of the three-dimensional model 104.

At block 606 the method may include determining, for the shell, whether a configuration of a three-dimensional model feature of the three-dimensional model 104 matches a removable feature configuration from a set of removable feature configurations 114.

Based on a determination that the configuration of the three-dimensional model feature of the three-dimensional model 104 matches the removable feature configuration from the set of removable feature configurations 114, at block 608 the method may include removing the three-dimensional model feature from the three-dimensional model 104 to generate a modified three-dimensional model.

Referring to FIGS. 1-4 and 7, and particularly FIG. 7, for the block diagram 700, the non-transitory computer readable medium 702 may include instructions 706 to ascertain a three-dimensional model 104 of a three-dimensional object 106 to be printed.

The processor 704 may fetch, decode, and execute the instructions 708 to determine a shell that represents outer three-dimensional model features of the three-dimensional model 104.

The processor 704 may fetch, decode, and execute the instructions 710 to determine, for the shell, whether a configuration of a three-dimensional model feature of the three-dimensional model 104 matches a non-removable feature configuration from a set of non-removable feature configurations 114.

Based on a determination that the configuration of the three-dimensional model feature of the three-dimensional model 104 matches the non-removable feature configuration from the set of non-removable feature configurations 114, the processor 704 may fetch, decode, and execute the instructions 712 to retain the three-dimensional model feature in the three-dimensional model 104, and cause the three-dimensional object 106 to be printed based on the three-dimensional model 104.

What has been described and illustrated herein is an example along with some of its variations. The terms, descriptions and figures used herein are set forth by way of illustration and are not meant as limitations. Many variations are possible within the spirit and scope of the subject matter, which is intended to be defined by the following claims— and their equivalents—in which all terms are meant in their broadest reasonable sense unless otherwise indicated.

What is claimed is:

1. An apparatus comprising:
a processor; and
a non-transitory computer readable medium storing machine readable instructions that when executed by the processor cause the processor to:
ascertain a three-dimensional (3D) model of a 3D object to be printed, the 3D model including a model feature, wherein the 3D object is to include a feature corresponding to the model feature when the 3D object is printed;
determine from the 3D model that the model feature is below a certain thickness;
based on the determination that the model feature is below the certain thickness, grow the model feature to ensure that the feature corresponding to the model feature is included in the 3D object when the 3D object is printed;
determine whether a configuration of a voxel of the 3D model matches a removable feature configuration from a set of removable feature configurations;
based on a determination that the configuration of the voxel of the 3D model matches the removable feature configuration from the set of removable feature configurations, remove the voxel from the 3D model to generate a modified 3D model; and
cause the 3D object to be printed based on the modified 3D model.

2. The apparatus according to claim 1, wherein the instructions are further to cause the processor to:
determine whether the configuration of the voxel of the 3D model matches a non-removable feature configuration from a set of non-removable feature configurations; and
based on a determination that the configuration of the voxel of the 3D model matches the non-removable feature configuration from the set of non-removable feature configurations, retain the voxel in the 3D model.

3. The apparatus according to claim 2, wherein
the non-removable feature configuration includes a centrally disposed voxel of the 3D model, and
the centrally disposed voxel of the 3D model is disposed between two further voxels of the 3D model.

4. The apparatus according to claim 1, wherein
the removable feature configuration includes a centrally disposed voxel of the 3D model, and
the centrally disposed voxel of the 3D model is disposed centrally and adjacent to three further voxels of the 3D model.

5. The apparatus according to claim 1, wherein
the removable feature configuration includes a voxel of a set of four voxels of the 3D model, and
the set of four voxels form a square shape with respect to the 3D model.

6. The apparatus according to claim 1, wherein the model feature has a radius that is below a minimum feature radius, and wherein the instructions are further to cause the processor to:
grow the model feature by increasing the radius of the identified model feature to the minimum feature radius.

7. A computer implemented method comprising:
ascertaining a three-dimensional (3D) model of a 3D object to be printed;
determining a shell that represents an outer 3D model feature of the 3D model, wherein the 3D object is to include a feature corresponding to the 3D model feature when the 3D object is printed;

determining from the 3D model that the 3D model feature is below a certain thickness;

based on the determination that the 3D model feature is below the certain thickness, growing the 3D model feature to ensure that the feature corresponding to the 3D model feature is included in the 3D object when the 3D object is printed;

determining, for the shell, whether a configuration of a voxel of the 3D model matches a removable feature configuration from a set of removable feature configurations;

based on a determination that the configuration of the voxel of the three-dimensional model matches the removable feature configuration from the set of removable feature configurations, removing the voxel from the 3D model to generate a modified 3D model; and causing the 3D object to be printed based on the modified 3D model.

8. The method according to claim 7, further comprising:

determining, for the shell, whether the configuration of the voxel of the 3D model matches a non-removable feature configuration from a set of non-removable feature configurations; and based on a determination that the configuration of the voxel of the 3D model matches the non-removable feature configuration from the set of non-removable feature configurations, retaining the voxel in the 3D model.

9. The method according to claim 8, wherein the non-removable feature configuration includes a centrally disposed voxel of the 3D model, and the centrally disposed voxel of the 3D model is disposed between two further voxels of the 3D model.

10. The method according to claim 7, wherein the removable feature configuration includes a centrally disposed voxel of the 3D model, and the centrally disposed voxel of the 3D model is disposed centrally and adjacent to three further voxels of the 3D model.

11. A non-transitory computer readable medium having stored thereon machine readable instructions, the machine readable instructions, when executed, cause a processor to:

ascertain a three-dimensional (3D) model of a three-dimensional object to be printed;

determine a shell that represents an outer 3D model feature of the 3D model, wherein the 3D object is to include a feature corresponding to the 3D model feature when the 3D object is printed;

determine from the 3D model that the 3D model feature is below a certain thickness;

based on the determination that the 3D model feature is below the certain thickness, grow the 3D model feature to modify the 3D model;

determine, for the shell, whether a configuration of a voxel of the 3D model matches a non-removable feature configuration from a set of non-removable feature configurations; and based on a determination that the configuration of the voxel of the 3D model matches the non-removable feature configuration from the set of non-removable feature configurations, retain the three-dimensional model feature in the 3D model, and cause the 3D object to be printed based on the modified 3D model.

12. The non-transitory computer readable medium according to claim 11, wherein the machine readable instructions, when executed, further cause the processor to:

determine, for the shell, whether the configuration of the voxel of the 3D model matches a removable feature configuration from a set of removable feature configurations; and based on a determination that the configuration of the voxel of the 3D model matches the removable feature configuration from the set of removable feature configurations, remove the voxel from the modified 3D model.

13. The non-transitory computer readable medium according to claim 11, wherein the 3D model feature has a radius that is below a minimum feature radius, and wherein the machine readable instructions, when executed, further cause the processor to:

grow the 3D model feature by increasing a radius of the identified 3D model feature to the minimum feature radius.

\* \* \* \* \*